(12) United States Patent
Kim

(10) Patent No.: US 7,150,013 B2
(45) Date of Patent: Dec. 12, 2006

(54) APPARATUS AND METHOD FOR UPGRADING PROGRAM

(75) Inventor: Gyung-yeol Kim, Yongin-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 615 days.

(21) Appl. No.: 10/124,242

(22) Filed: Apr. 18, 2002

(65) Prior Publication Data

US 2003/0074658 A1    Apr. 17, 2003

(30) Foreign Application Priority Data

Oct. 17, 2001    (KR) ................... 2001-63950

(51) Int. Cl.
  *G06F 9/44*     (2006.01)
  *G06F 15/177*   (2006.01)
  *G06F 9/445*    (2006.01)
  *G06F 13/00*    (2006.01)
  *G06F 3/00*     (2006.01)
  *G06F 13/12*    (2006.01)
  *G06F 12/00*    (2006.01)

(52) U.S. Cl. ............. 717/168; 717/174; 713/2; 719/321; 719/327; 710/8; 710/62; 711/100

(58) Field of Classification Search ........ 717/168–178; 713/1, 100, 2, 8, 13, 62, 72, 73, 74; 710/72, 710/1, 2, 8, 13, 62, 73, 74; 711/1, 2, 4, 100, 711/115, 170; 719/310, 321, 327, 328
See application file for complete search history.

(56) References Cited

U.S. PATENT DOCUMENTS

| | | | | |
|---|---|---|---|---|
| 5,440,632 | A * | 8/1995 | Bacon et al. ............... | 380/242 |
| 5,463,742 | A * | 10/1995 | Kobayashi ................... | 710/303 |
| 5,768,539 | A * | 6/1998 | Metz et al. ................. | 709/249 |
| 5,835,761 | A * | 11/1998 | Ishii et al. ................... | 713/100 |
| 5,898,869 | A * | 4/1999 | Anderson ...................... | 713/2 |
| 5,909,502 | A * | 6/1999 | Mazur ......................... | 382/135 |
| 5,978,591 | A | 11/1999 | Bartholomew et al. | |
| 6,009,524 | A * | 12/1999 | Olarig et al. ................. | 726/10 |
| 6,021,276 | A | 2/2000 | Demke et al. | |
| 6,085,268 | A * | 7/2000 | Lee et al. .................... | 710/72 |
| 6,308,265 | B1 * | 10/2001 | Miller ........................... | 713/2 |
| 6,381,741 | B1 * | 4/2002 | Shaw .......................... | 717/168 |
| 6,389,427 | B1 * | 5/2002 | Faulkner .................... | 707/104.1 |

(Continued)

FOREIGN PATENT DOCUMENTS

EP    1 087 294 A2    3/2001

(Continued)

OTHER PUBLICATIONS

TITLE: Update on PCMCIA standards Activities: CardBus and Beyond, author: Harper, IEEE, 1995.*

(Continued)

*Primary Examiner*—Anthony Nguyen-Ba
(74) *Attorney, Agent, or Firm*—Sughrue Mion, PLLC

(57) ABSTRACT

An apparatus and a method for upgrading a program that controls a microprocessor. The program upgrading method includes: installing a Personal Computer Memory Card International Association (PCMCIA) interface device in the system; recording the upgrading program in a PCMCIA card; downloading the upgrading program from the PCMCIA card through the PCMCIA interface device installed in the system under the control of the program stored in the memory; and upgrading the program stored in the memory with the downloaded program under the control of the program stored in the memory. The program upgrading method can perform program upgrading through a PCMCIA interface easily.

8 Claims, 4 Drawing Sheets

U.S. PATENT DOCUMENTS

| | | | |
|---|---|---|---|
| 6,425,125 B1 * | 7/2002 | Fries et al. | 717/168 |
| 6,453,414 B1 * | 9/2002 | Ryu | 713/2 |
| 6,470,496 B1 * | 10/2002 | Kato et al. | 717/173 |
| 6,615,404 B1 * | 9/2003 | Garfunkel et al. | 717/173 |
| 6,732,267 B1 * | 5/2004 | Wu et al. | 713/100 |
| 6,808,424 B1 * | 10/2004 | Kaneshiro et al. | 439/638 |
| 6,839,486 B1 * | 1/2005 | Kopp et al. | 385/37 |
| 6,895,345 B1 * | 5/2005 | Bye et al. | 702/57 |
| 6,900,983 B1 * | 5/2005 | Glusing et al. | 361/686 |

FOREIGN PATENT DOCUMENTS

| | | |
|---|---|---|
| JP | 11-242596 A | 9/1999 |
| JP | 2000-148-502 A | 5/2000 |
| JP | 2000-172508 A | 6/2000 |
| JP | 2002-163110 A | 6/2002 |
| WO | WO 00/72276 A1 | 11/2000 |

OTHER PUBLICATIONS

TITLE: PCMCIA Card development, author: Porooshani, IEEE, 1995.*

* cited by examiner

APPARATUS AND METHOD FOR UPGRADING PROGRAM

BACKGROUND OF THE INVENTION

1. Field of the Invention

The present invention relates to an apparatus using a microprocessor, and more particularly, to an apparatus and a method for upgrading a program that controls a microprocessor. The present application is based on Korean Application No. 2001-63950, filed Oct. 17, 2001, which is incorporated herein by reference.

2. Description of the Related Art

An existing digital television or a set-top box has a microprocessor and a built-in program that operates a system to meet the needs of a user. The program is stored in a non-volatile memory when the system is manufactured in a factory, and can be modified and upgraded by a service engineer after the system is released.

While analog broadcasting is replaced by digital broadcasting, the broadcasting specification may be changed. Additionally, there may be a problem with the program. Therefore, the program needs to be changed frequently.

As a result, easy upgrading of the program is more important than ever before.

FIG. 1 shows an existing method for upgrading a program.

With reference to FIG. 1, a system 100 is controlled by a microprocessor 102. A program that controls the microprocessor 102 is stored in a program memory 104. The program memory 104 is implemented as a non-volatile memory for upgrading the program, such as a flash Read Only Memory (ROM), an Electrically Erasable and Programmable Read-Only Memory (EEPROM) and a nonvolatile random access memory (NVRAM).

The NVRAM is a non-volatile RAM that can protect recorded data even though external power to a computer is turned off or lost. Some modems use the NVRAM as a memory that saves a telephone number designated by a user or a setup value of the modem.

In some cases, the program stored in the program memory 104 of the system 100 shown in FIG. 1 needs to be upgraded for improvement, to provide enhanced performance, or to eliminate a bug.

For upgrading, the system 100 shown in FIG. 1 includes an RS-232C 106 and an RS-232C connector 108 that can interface with an external computer 150. The RS-232C is a specification that describes a physical connection and a protocol that enable the computer and relevant devices to perform a serial data communication at a relatively low speed.

As the external computer 150, a portable notebook PC is used.

To upgrade the program, the service engineer connects the external computer 150 and the system 100, using the RS-232C cable, and downloads an upgrading program from the external computer 150. The downloaded program upgrades the program stored in the program memory 104.

In a boot area of the program memory 104, there is a boot loader that is a program which controls the program upgrading. The boot loader stores the downloaded program in an empty area of the RAM or the program memory 104, and upgrades the existing program using the downloaded program.

After the program upgrading is completed, the system is rebooted. The boot loader loads the upgraded program and the system is controlled by the upgraded program.

When upgrading the program of the system shown in FIG. 1, the service engineer should carry the notebook PC which saves the upgrading program and connect the external computer with the system 100, using the RS232C cable in order to upgrade the program.

Therefore, the existing program upgrading is disadvantageous in that it necessitates a complicated process and the external computer.

SUMMARY OF THE INVENTION

To solve the above-described problems, it is an object of the present invention to provide a method for upgrading a program of a system easily.

It is another object of the present invention to provide an apparatus which is suitable for the program upgrading.

To achieve the above object, a method for upgrading a program stored in a memory in a system which includes a microprocessor and the memory that has a program designed to control the microprocessor, the program upgrading method including:

installing a Personal Computer Memory Card International Association (PCMCIA) interface device in the system;

recording the upgrading program in a PCMCIA card;

downloading the upgrading program from the PCMCIA card through the PCMCIA interface device installed in the system under the control of the program stored in the memory; and upgrading the program stored in the memory with the downloaded program under the control of the program stored in the memory.

To achieve another object, the system using the microprocessor according to the present invention includes:

a microprocessor;

a memory having application programs designed to implement a specific operation by controlling the microprocessor and a boot program deigned to control the loading of the application programs during booting; and a Personal Computer Memory Card International Association (PCMCIA) interface unit.

The method for upgrading a program stored in a memory in a system which includes a microprocessor, application programs designed to implement a specific operation by controlling the microprocessor, the memory that stores a boot program designed to control the load of the application programs during booting, and a Personal Computer Memory Card International Association (PCMCIA) interface unit, the program upgrading method including:

downloading an upgrading program from the PCMCIA card through the PCMCIA interface device under the control of the application programs stored in the memory;

saving the program downloaded under the control of the application programs stored in the memory in a buffer memory area;

setting a flag indicating the program upgrading in the memory area which is referred to by a boot loader and rebooting the system; and upgrading the application programs stored in the memory with the program stored in the buffer memory area and resetting the flag if the flag is set.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

The present invention will now be described in detail by describing preferred embodiments thereof with reference to the accompanying drawings.

A program upgrading method according to the present invention uses a Personal Computer Memory Card International Association (PCMCIA) card. The PCMCIA is an international standard association which was established in 1989 in order to develop a specification on an IC card and improve interworking between mobile computers.

Until 1991, the PCMCIA defined an I/O interface of a 68-pin connector used in a memory card and prepared specifications on a socket service and a card service.

As demand for high-speed applications such as a multimedia and a high-speed network have recently been increasing, the PCMCIA established specifications on a card bus and a zoomed video for MPEG video and 100 Mbps applications. The PCMCIA continued to add specifications in order to enhance compatibility and added 3.3 V operation or a power management function for mobility. The PC card of the PCMCIA is applied not only to a mobile computer, but also a digital camera, a cable TV, a set-top box and an automobile.

The physical specifications include Type I, Type II and Type III. The three physical specifications use a 69-pin connector with the same width (54 mm) and length (85.6 mm) and with different thickness (3.3, 5.0, 10.5 mm). Due to the different thicknesses, the three physical specifications are used for different applications. Type I is used for a memory such as RAM, flash, OTP (one-time programmable) and SRAM (static random access memory). Type II is used for a fax, a modem, a Local Area Network (LAN) and a memory device. Type III is used for a hard disc.

Figure 1:
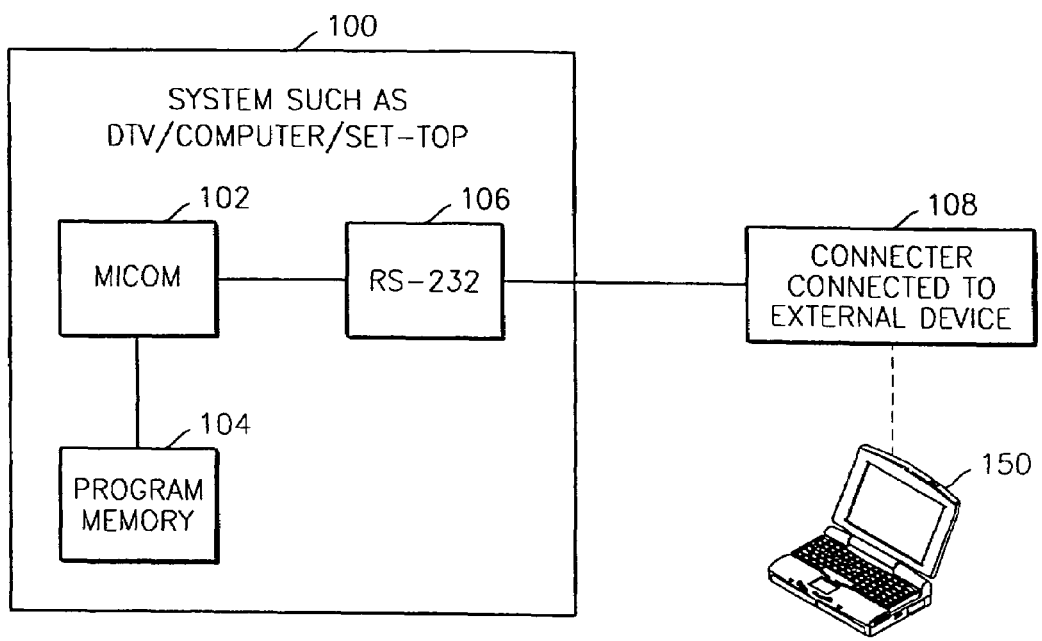
FIG. 1 shows an existing method for upgrading a program.
Figure 2:
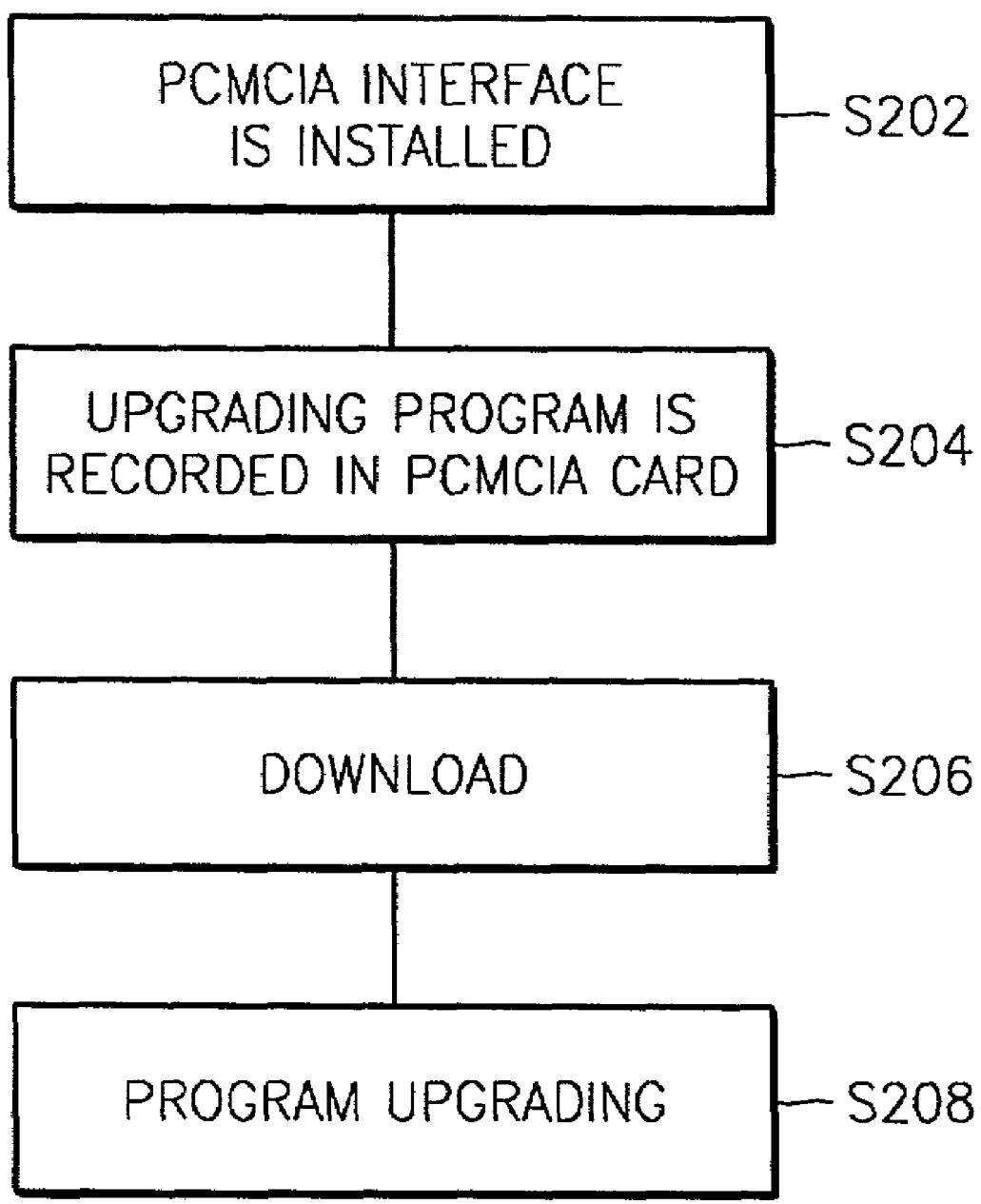
FIG. 2 is a flowchart showing a method for upgrading a program according to the present invention.

FIG. 2 is a flowchart showing a method for upgrading a program according to the present invention.

With reference to FIG. 2, a PCMCIA interface device is installed on the system in step S202. The PCMCIA interface device includes the connector to which the PCMCIA card is connected.

The PCMCIA card that saves the upgrading program is connected to the PCMCIA connector of the system in step S204.

The upgrading program is downloaded from the PCMCIA card in step S206.

The existing installed program is upgraded by the downloaded program in step S208.

Since the program upgrading method according to the present invention does not use the RS232C, the external computer is not needed, and connecting and downloading from the external computer are not required. Therefore, the program upgrading can be performed easily and quickly.

Figure 3:
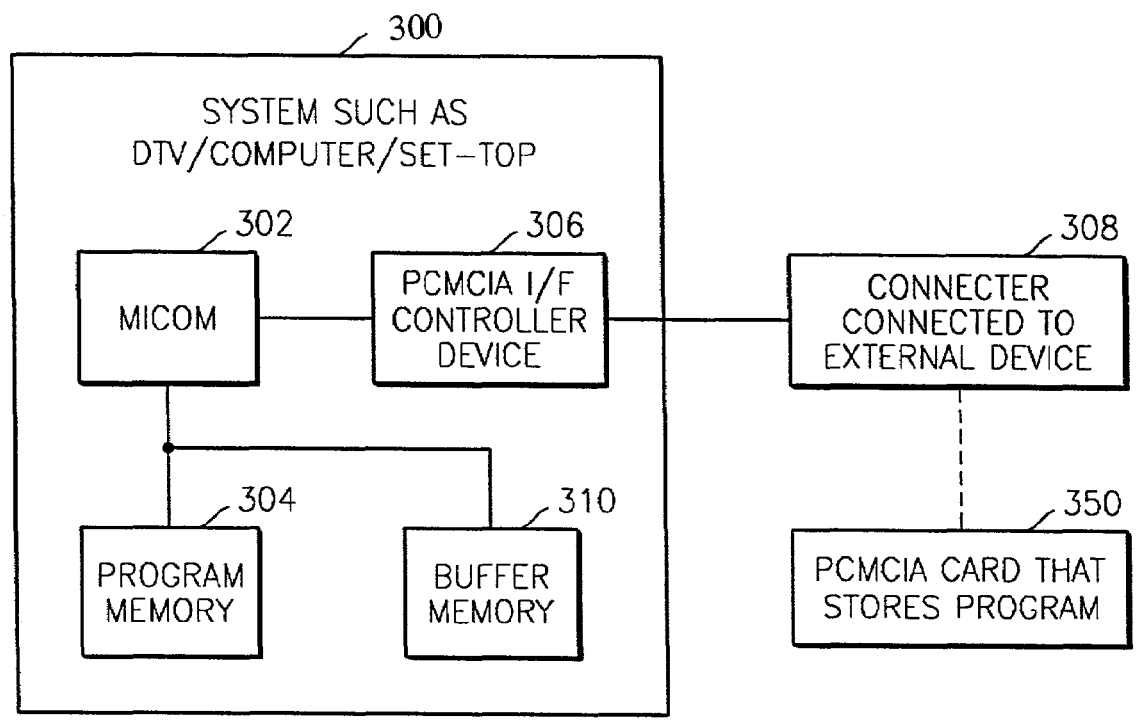
FIG. 3 is a block diagram showing the configuration of a program upgrading apparatus according to the present invention.

FIG. 3 is a block diagram showing the configuration of a program upgrading apparatus according to the present invention.

With reference to FIG. 3, a system 300 is controlled by a microprocessor 302. A program that controls the microprocessor 302 is stored in a program memory 304. The program memory 304 is implemented as a non-volatile memory that can be recorded for upgrading the program, such as a flash ROM, EEPROM and a nonvolatile random access memory (NVRAM).

In some cases, the program stored in the program memory 304 of the system 300 shown in FIG. 3 needs to be upgraded for improved performance or for elimination of a bug.

For program upgrading, the system 300 shown in FIG. 3 includes a PCMCIA interface unit 306 and a PCMCIA connector 308.

To upgrade the program, the service engineer inserts the PCMCIA card 350 that stores the upgrading program into the PCMCIA connector 308, and downloads the upgrading program. The downloaded program is stored in a buffer memory 310 temporarily and upgrades the program stored in the program memory 304.

The downloaded program may be a compressed program. Thus, before program upgrading is performed, the compressed program needs to be decompressed.

In a boot area of the program memory 304, there is a boot loader that is a program which controls the program upgrading. The boot loader stores the downloaded program in an empty area of the buffer memory 310 or the program memory 304, and upgrades the existing program using the downloaded program.

After the program upgrading is completed, the system is rebooted. The boot loader loads the upgraded program and the system is controlled by the upgraded program.

Figure 4:
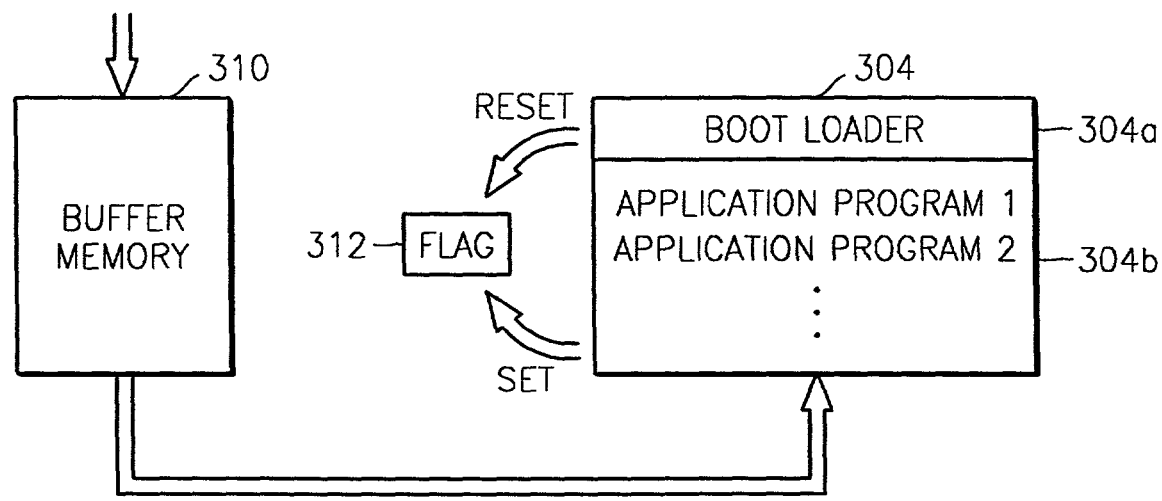
FIG. 4 shows a detailed process where the program upgrading apparatus shown in FIG. 3 upgrades a downloaded program.

FIG. 4 shows a detailed process where the program upgrading apparatus shown in FIG. 3 upgrades a downloaded program.

With reference to FIG. 4, the program memory 304 includes a boot loader area 304a that stores the boot loader, and a main program area 304b that stores a main program. The buffer memory 310 may be a non-volatile memory where additional recording can be performed, or a reserved space of the program memory 304.

A menu program is used to select downloading/upgrading. The menu program is included in the main program.

That is, a user selects the upgrading of the program in a menu program. If the user enters a request for program upgrading, the upgrading program is downloaded from the PCMCIA card 350. The downloaded program is stored in the buffer memory 310.

When the downloading is completed, a flag for upgrading of the program stored in the EEPROM 312 is set and the system is rebooted. The EEPROM 312 may be an additional memory module which is separated physically from the program memory 304. In addition, the address of the EEPROM 312 may constitute a part of an extensive address system including the program memory 304.

If the system is rebooted, the boot loader controls the installation of the main program, and refers to the flag for upgrading of the program stored in the EEPROM 312. If the flag is set, the downloaded program stored in the buffer memory 310 is recorded in the main program area 302b. Then, the program upgrading is performed.

After the program is upgraded, the boot loader resets the flag for upgrading of the program stored in the EEPROM 310 and reboots the system.

When the system is rebooted, the boot loader refers to the flag for upgrading of the program stored in the EEPROM 312. If the flag is reset, the main program recorded in the main program area 302b is loaded.

After the above process, the main program controls the system.

As described above, the program upgrading method according to the present invention can upgrade the program easily, using the PCMCIA interface.

Although preferred embodiments of the present invention have been shown and described, it will be appreciated by those skilled in the art that changes may be made to these embodiments without departing from the principles and spirit of the invention, the scope of which is defined in the claims and their equivalents.

What is claimed is:

1. A method for upgrading a program stored in a system which includes a microprocessor, a first memory storing the program designed to control the microprocessor, and a second memory, the program upgrading method comprising:

installing a Personal Computer Memory Card International Association (PCMCIA) interface device for interfacing with a PCMCIA card in the system;

downloading an upgrading program from the PCMCIA card to the second memory, through the PCMCIA interface device installed in the system, under the control of another program stored in the first memory; and upgrading the program stored in the first memory with the upgrading program stored in the second memory, wherein the upgrading is performed under the control of the other program stored in the first memory.

2. The method of claim 1, wherein the first memory and the second memory are the same memory.

3. The method of claim 1, wherein the system is included in one of a television and a set-top box.

4. The method of claim 1, wherein the upgrading is performed under the control of the other program stored in the first memory, when the system is rebooted.

5. A method for upgrading a program stored in a memory in a system which includes a microprocessor, an application program designed to implement a specific operation by controlling the microprocessor, the memory that stores a boot program designed to control loading of the application program during booting, and a Personal Computer Memory Card International Association (PCMCIA) interface unit for interfacing with a PCMCIA card, the program upgrading method comprising:

downloading an upgrading program from the PCMCIA card through the PCMCIA interface device under the control of the boot program stored in the memory;

storing the upgrading program downloaded under the control of the boot program stored in the memory in a buffer memory area;

setting a flag indicating the upgrading program is stored in the buffer memory area;

rebooting the system and checking the flag, under the control of the boot program; and if the flag is determined to be set, upgrading the application program stored in the memory with the upgrading program stored in the buffer memory area and resetting the flag, under the control of the boot program.

6. The method of claim 5, wherein the system is included in one of a television and a set-top box.

7. A system, comprising:

a microprocessor;

a memory having an application program designed to implement a specific operation by controlling the microprocessor and a boot program designed to control loading of the application program during booting; and a Personal Computer Memory Card International Association (PCMCIA) interface unit for interfacing with a PCMCIA card, wherein the boot program downloads an upgrading program from the PCMCIA card through the PCMCIA interface device, stores the downloaded upgrading program in a buffer memory area, sets a flag indicating the upgrading program is stored in the buffer memory area, reboots the system, and if the flag is set when the system is rebooted, the boot program upgrades the application program stored in the memory with the upgrading program stored in the buffer memory area and resets the flag.

8. The system of claim 7, wherein the system is included in one of a television and a set-top box.

* * * * *